United States Patent
Choi et al.

(10) Patent No.: US 8,213,033 B2
(45) Date of Patent: Jul. 3, 2012

(54) COMMON DRIVER APPLICATION DEVICE AND METHOD

(75) Inventors: Jun-young Choi, Suwon-si (KR); Young-ju Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1039 days.

(21) Appl. No.: 10/998,724

(22) Filed: Nov. 30, 2004

(65) Prior Publication Data

US 2005/0128501 A1   Jun. 16, 2005

(30) Foreign Application Priority Data

Dec. 15, 2003   (KR) .................. 10-2003-0091486

(51) Int. Cl.
*G06F 3/12* (2006.01)
*G06F 15/00* (2006.01)

(52) U.S. Cl. ....... 358/1.15; 358/1.13; 358/1.1; 719/327; 719/321

(58) Field of Classification Search ................ 358/1.15, 358/1.13, 1.1
See application file for complete search history.

(56) References Cited

U.S. PATENT DOCUMENTS

| | | | | |
|---|---|---|---|---|
| 6,078,400 A * | 6/2000 | Mizutani | ........... | 358/1.14 |
| 6,148,346 A * | 11/2000 | Hanson | ........... | 719/321 |
| 6,426,799 B1 * | 7/2002 | Okimoto et al. | ........... | 358/1.15 |
| 6,567,175 B1 * | 5/2003 | Lee | ........... | 358/1.14 |
| 6,606,669 B1 * | 8/2003 | Nakagiri | ........... | 719/327 |
| 6,672,771 B2 * | 1/2004 | Cox et al. | ........... | 385/53 |
| 6,762,771 B1 * | 7/2004 | Niki et al. | ........... | 715/700 |
| 6,825,941 B1 * | 11/2004 | Nguyen et al. | ........... | 358/1.15 |
| 6,891,631 B1 * | 5/2005 | Nakazato | ........... | 358/1.13 |
| 6,952,831 B1 * | 10/2005 | Moore | ........... | 719/327 |
| 2002/0030852 A1 * | 3/2002 | Matsuo | ........... | 358/1.15 |
| 2002/0143924 A1 * | 10/2002 | Iga | ........... | 709/223 |
| 2005/0012952 A1 * | 1/2005 | Woo | ........... | 358/1.13 |

FOREIGN PATENT DOCUMENTS

| | | |
|---|---|---|
| JP | 2000-020259 | 1/2000 |
| JP | 2001-159959 | 6/2001 |
| JP | 2002-175258 | 6/2002 |
| JP | 2002-229748 | 8/2002 |
| KR | 2000-9162 A | 2/2000 |

* cited by examiner

*Primary Examiner* — Dov Popovici
*Assistant Examiner* — Huo Long Chen
(74) *Attorney, Agent, or Firm* — Stanzione & Kim, LLP

(57) ABSTRACT

A common driver application device and method. A first communication unit provides a communication interface with a first printing apparatus, a common printer driver unit loads from the first printing apparatus print information including default values for print options and an emulation type that the first printing apparatus supports, and provides a print option setting menu enabling a user to adjust the default values for the print options, if the first communication unit is communicatively connected to the first printing apparatus, and a central processing unit controls the common printer driver unit to load the print information from the first printing apparatus, if the first communication unit is connected to the first printing apparatus. Thus, one common printer driver to drive plural printers connected to a computer can be provided.

29 Claims, 8 Drawing Sheets

COMMON DRIVER APPLICATION DEVICE AND METHOD

CROSS-REFERENCE TO RELATED APPLICATIONS

This application claims benefit under 35 U.S.C. §119 from Korean Patent Application No. 2003-91486 filed on Dec. 15, 2003, the entire content of which is incorporated herein by reference.

BACKGROUND OF THE INVENTION

1. Field of the Invention

The present general inventive concept relates to a common printer driver application device and a method. More particularly, the present invention pertains to a common driver application device and a method enabling one common printer driver to drive a plurality of printers connected to a computer.

2. Description of the Related Art

In general, a printing device such as a printer is connected to a host computer. A printer driver related to the printer is installed on the host computer to enable the printer to print documents prepared by the host computer.

The printer driver provides a User Interface (UI) window so as to enable users to set print conditions such as a number of pages, a print range, and a paper size, relating to print documents prepared by the host computer. Furthermore, the printer driver converts the print documents prepared by the host computer into a printer language. The printer language refers to commands corresponding to an emulation mode supported by the printer. The printer can support various emulations such as PCL, KSSM, and Postscript.

Each printer provides a different UI window depending upon a printer language and version that each printer supports. As a result, under conventional circumstances in which a plurality of printers are connected to one host computer, a user has to install a different printer driver for each of the printers if the printers support different printer languages and printer functions, respectively. In addition, when replacing printers connected to the host computer or adding printers to the host computer, a user has to install printer drivers in the host computer for the replaced or added printers. As new functions are added to the connected printers, the user also has to re-install printer drivers in the computer for the printers to which the new functions have been added.

Under conventional circumstances as described above, printer users and manufacturers experience inconveniences since the different printer drivers provide different UI windows that are not consistent with one another. Therefore, users feel inconvenienced when manipulating or setting print conditions through the different UI windows. Furthermore, manufacturers experience inconveniences when producing the different printer drivers that provide a different UI window depending upon the printer languages and printer functions that each printer supports.

SUMMARY OF THE INVENTION

The present general inventive concept has been developed in order to solve the above and/or other drawbacks and problems associated with the conventional arrangement. Accordingly, the present general inventive concept provides a common printer driver application device and a method capable of eliminating inconveniences related to installing new printer drivers every time printers connected to a computer are replaced.

Additional aspects and advantages of the present general inventive concept will be set forth in part in the description which follows and, in part, will be obvious from the description, or may be learned by practice of the general inventive concept.

The foregoing and other aspects and advantages of the present general inventive concept are achieved by providing a common driver application device including a first communication unit to provide a communication interface with a printer, a common printer driver unit to load from the printer print information including default values for print options and emulation types that are supported by the printer, and providing a print-option-setting menu enabling a user to adjust the default values for the print options, if the first communication unit is communicatively connected to the printer, and a central processing unit to execute the common printer driver unit to load the print information from the printer, if the first communication unit is connected to the first print apparatus.

The common driver application device further includes a user input unit to request the print-option-setting menu to be displayed, and to enable a user to adjust the default values of the print options if the print-option-setting menu is displayed. When a display request is received from the user input unit the central processing unit control the common driver unit to request the loading of the print information and to generate the print-option-setting menu.

The common printer driver unit includes a loading unit to request and load the print information to and from the printer, a first printer information storage to store the loaded print information, a detailed information storage to store detailed information on predetermined options of the print options that are provided differently depending on the emulation type, and a menu generation unit to generate the print-option-setting menu based on the stored print information and the stored detailed information on the predetermined options. The central processing unit controls the common printer driver unit to request the loading of the print information and to generate the print option setting menu, if the display request is received from the user input unit.

The detailed information on the predetermined options includes minimum and maximum values of print resolution that are provided differently depending on the emulation type. The emulation type that a printer may support can be on or more of, for example, a Printer Control Language (PCL), KSSM, KS, Epson, or PostScript.

If a first printer connected to the first communication unit is replaced with a second printer and the first and second printers have the same manufacturer identifications (IDs) but different serial numbers, the common printer driver unit loads the print information of the second printer from the second printer.

The print options can be functions that are provided differently depending on the type of printer. The print options can be one or more of, for example, a type of paper on which data is printed, a paper orientation, a number of copies, and a print resolution.

The printer includes a second print information storage to store the print information to be loaded by the loading unit, a printer information readout unit to read out the print information from the second print information storage, a second communication unit to send the read print information to the first communication unit, and a control unit to control the printer information readout unit and the second communication unit to read out and send the print information to the first communication unit, if the loading is requested from the loading unit.

The foregoing and/or other aspects and advantages of the present general inventive concept are also achieved by providing a common driver application method including communicatively connecting to a printer, requesting to the printer to load print information including default values for print options and an emulation type that the printer supports, storing the print information loaded from the printer, and providing a print-option-setting menu to enable a user to adjust the default values for the print options.

The common driver application method may further include requesting display of the print-option-setting menu to enable a user to adjust the default values for the print options prior to the connection operation. The operation of providing the print-option-setting menu generates and displays the print-option-setting menu based on the stored print information and detailed information on predetermined options of the print options provided differently depending on the emulation type.

The common driver application method may further include reading out the stored print information from the printer if the common printer driver unit requests the loading of the print information, and sending the read print information to the common printer driver unit.

The foregoing and/or other aspects and advantages of the present general inventive concept are also achieved by providing a computer-readable medium to provide commands for computers to execute a process including operations of communicatively connecting to a printer, requesting the printer to load print information including default values for print options and an emulation type that the printer supports, storing the loaded print information that the printer provides, and providing a print-option-setting menu enabling a user to adjust the default values for the print options.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
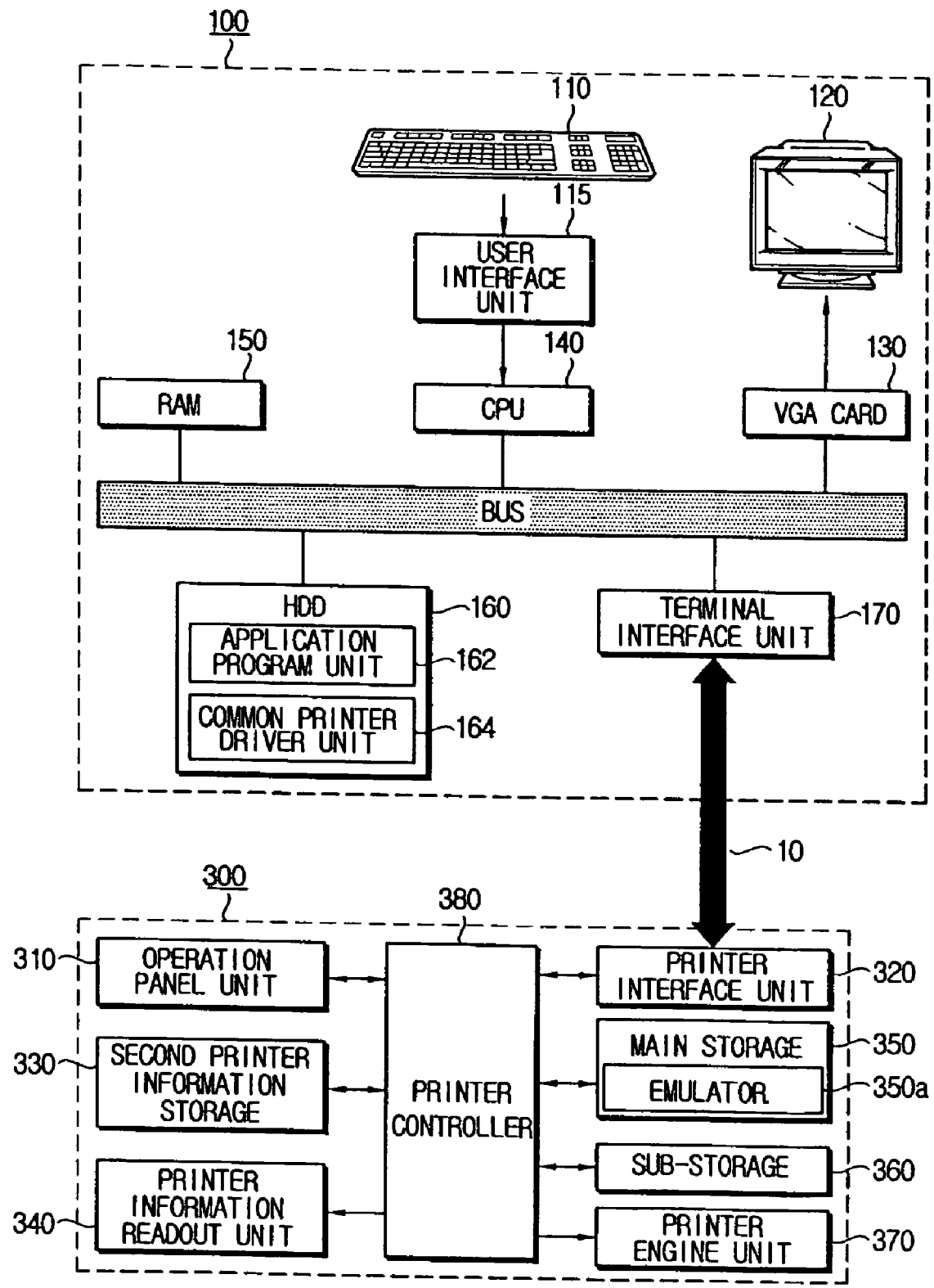
FIG. 1 is a view illustrating a printer system provided with a common printer driver unit according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic view illustrating a printer system provided with a common printer driver unit 164 according to an embodiment of the present general inventive concept.

Referring to FIG. 1, a printer system according to the present embodiment has a user terminal 100 and a printer 300. Only blocks related to a common printer driver according to the present general inventive concept are shown in FIG. 1, and the other blocks are omitted for conciseness.

The user terminal 100 generates data to be printed and sends the data to the printer 300 through a communication network 10. Here, the user terminal 100 is a host computer having a common printer driver relating to the printer 300 by way of example.

The common printer driver is a printer driver supporting the driving of a plurality of printers connected to the user terminal 100. When one common printer driver is installed in the user terminal 100, there is no need to have printer drivers installed for replaced printers (not shown) even though the printers connected to the user terminal 100 have been replaced.

If a new printer (not shown) replaced for the currently connected printer 300 has the same manufacturer identifier (ID) but has a different product serial number, the new printer can be driven by use of the common printer driver unit 164 according to the present general inventive concept. The manufacturer ID information enables identification of the printer manufacturer.

The communication network 10 enables the user terminal 100 to communicate with at least one printer 300 through a hub, LAN, Internet network or wireless network, in addition to communications through a parallel port, a serial port, an infrared port or an USB port.

The user terminal 100 having the common printer driver unit 164 described above includes a user input unit 110, a user interface unit 115, a display unit 120, a video graphic adapter (VGA) card 130, a central processing unit (CPU) 140, a random access memory (RAM) 150, a hard disk drive (HDD) 160, and a terminal interface unit 170. A bus is a data transmission path among the VGA card 130, RAM 150, HDD 160, terminal interface unit 170, and CPU 140.

The user input unit 110 outputs an operation request signal request functions supported by the user terminal 100, can be a keyboard, a mouse, or a touch panel or any other type of input device. The user interface unit 115 outputs to the CPU 140 a key input signal output from the user input unit 110.

The user input unit 110 outputs a print request signal to print documents prepared by the user terminal 100 document and a display request signal to display print-option-setting menu provided by the common printer driver unit 164.

The display unit 120 can be a general monitor, such as a Cathode Ray Tube (CRT), and Liquid Crystal Display (LCD), and displays the operation states of the user terminal 100 according to signals provided from the VGA card 130.

The VGA card 130 processes a general video signal into a signal displayable on the monitor, and processes and outputs the print-option-setting menu provided by the common printer driver unit 164 to the display unit 120.

The CPU 140 drives stored applications to control the overall operation of the user terminal 100. The RAM 150 contains the applications to be executed by the CPU 140 that have been loaded from the HDD 160, and contains data resulting from the execution of the applications by the CPU 140.

Upon receiving a display request signal to display a print-option-setting menu from the user input unit 110, the CPU 140 requests the loading of the print information, and drives the common printer driver unit 164 to generate the print-option-setting menu.

The HDD 160 stores the operating system. For example, the user terminal 100 can be configured to run based on a Microsoft™ Windows-based operating system.

The HDD 160 has an application program unit 162 and the common printer driver unit 164. The application program unit 162 stores applications in which various documents can be prepared.

The common printer driver unit 164 provides the print-option-setting menu. The print-option-setting menu can be a user interface enabling a user to adjust print options supported by the printer 300. The print options are supported by the printer 300 connected to the user terminal 100, and include, for example, various types of options such as paper size, paper type, orientation, number of copies, and resolution. In general, the print options vary according to printer type.

A user can adjust or use the default values for the print options provided by the printer 300 to set final print environment information. The final print environment information is output to the CPU 140 by the user interface unit 115. For example, if the default value set in the printer 300 for paper size is 'A4', a user can change the print option value for paper size.

If a document prepared in an application is to be printed, the common printer driver unit 164 converts the data for the document to be printed into print data that can be recognized by the printer 300.

According to another embodiment of the present general inventive concept, a printer driver is installed in the common printer driver unit 164 to support the driving of the printer 300 connected to the user terminal 100. The common printer driver unit 164 and the printer 300 are designed to be compatible with each other.

Specifically, the common printer driver unit 164 loads from the printer 300 the print information that the printer 300 supports. Next, the common printer driver unit 164 generates a print-option-setting menu based on the loaded print information. The print information includes the default values for print options and the emulation information that the printer 300 supports. The printer 300 can support one or more of the various types of emulation such as, for example, PCL, KSSM, KS, Epson, and PostScript.

Figure 2:
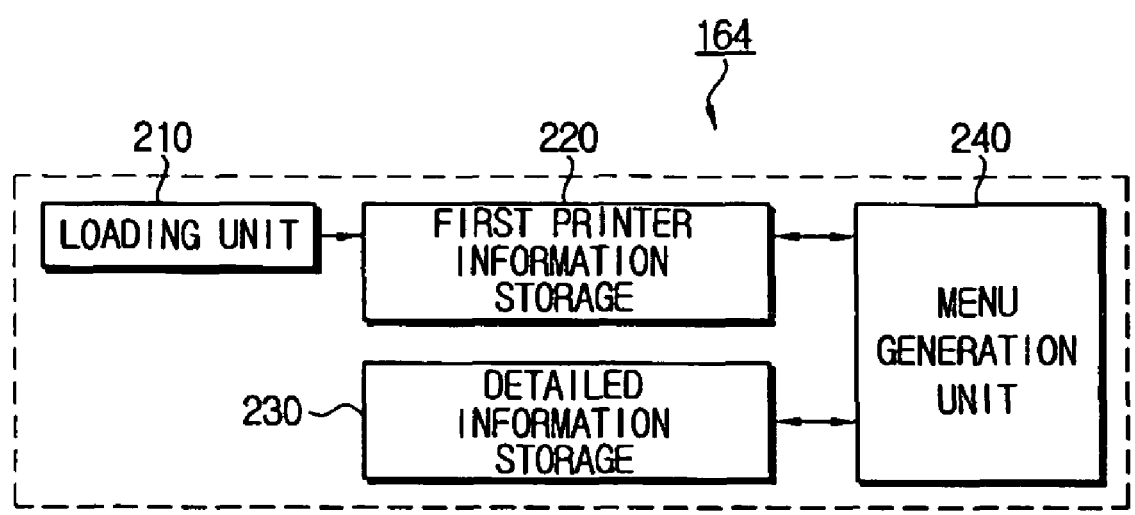
FIG. 2 is a block diagram illustrating in detail the common printer driver unit of FIG. 1.

To support the above operations, the common printer driver unit 164 is configured as shown in FIG. 2.

Referring to FIGS. 1 and 2, the common printer driver unit 164 has a loading unit 210, a first printer information storage 220, a detailed information storage 230, and a menu generation unit 240.

If the user terminal 100 is connected to the printer 300 through the terminal interface unit 170, the loading unit 210 requests the printer 300 to send print information stored in the printer 300. Additionally, upon receiving a display request signal from the user input unit 110 to display a print-option-setting menu after the connection to the printer 300 from the user terminal 100, the loading unit 210 requests the printer 300 to send the print information. The loading unit 210 provides the print information sent from the printer 300 to the first printer information storage 220 and the detailed information storage 230, respectively.

The received print information is stored in the first printer information storage 220 from the printer 300. That is, if the user terminal 100 is connected to a different printer (not shown) replacing the printer 300, the print information of the replacement printer (not shown) is stored in the first printer information storage 220. For example, the printer information on printers can be stored by the printer serial number or manufacturer identification.

If the sent print information already exists in the first printer information storage 220, the information can be updated by the sent print information. The stored or updated print information is used when the user terminal 100 fails to receive the print information from the printer 300 due to communication errors. The stored print information is also updated to the sent print information when the sent print information is a later version than the stored print information. The update can also be performed in a different way according to a driver production process or user's settings.

The printer 300 supports a plurality of print options. The detailed information storage 230 stores detailed information on the plurality of options provided depending upon the emulation types to be used by the printer 300.

For example, the printer resolution varies depending on the emulation types. If the printer 300 uses the PCL emulation, 600 dpi is set to the default value for print resolution included in the sent print information, but the detailed information for print resolution stored in the detailed information storage 230 ranges from a minimum value of 300 dpi to a maximum value of 4800 dpi.

Figure 3A:
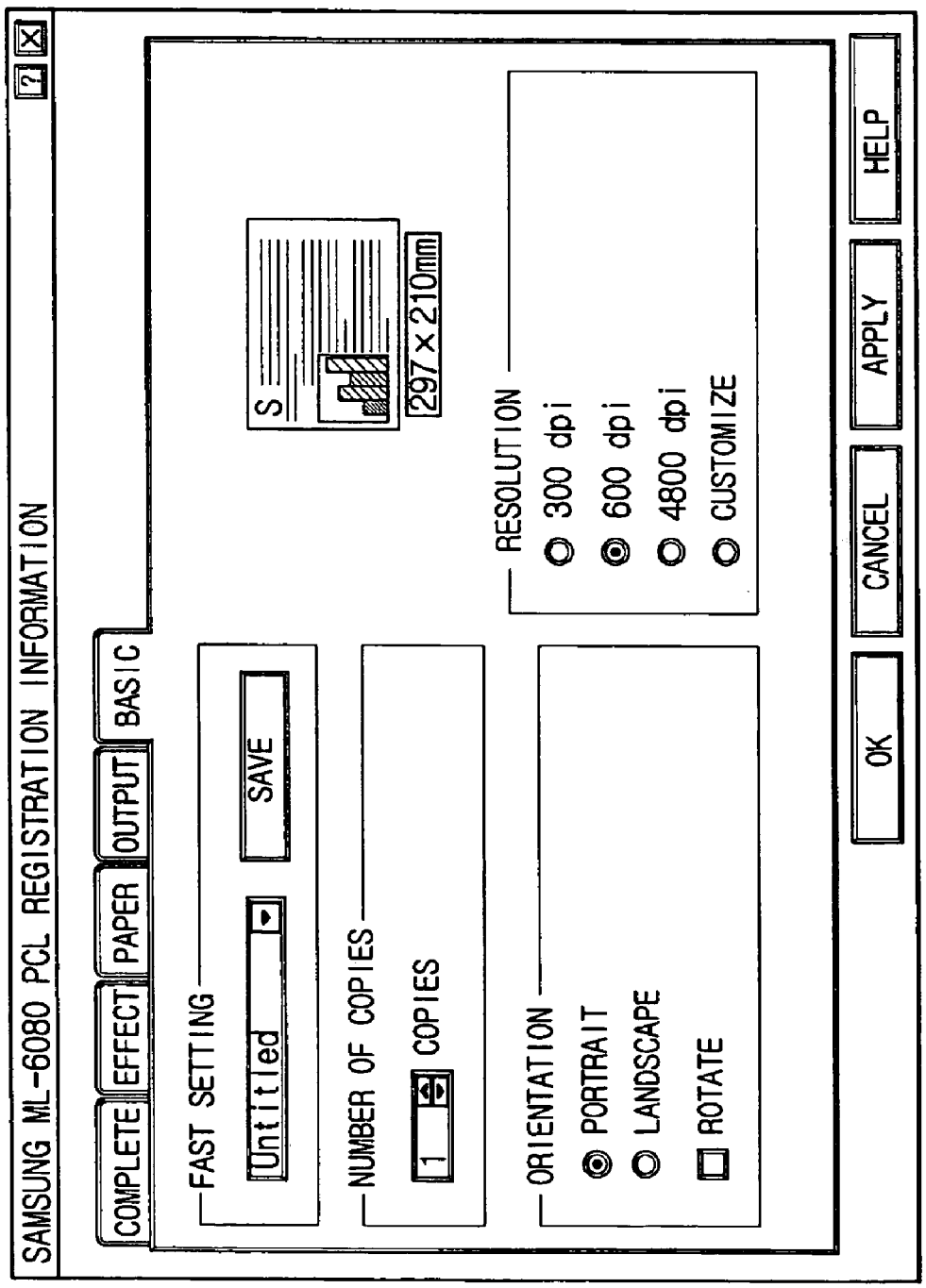
FIG. 3A is a view illustrating a print-option-setting menu generated by the menu generation unit of FIG. 2 based on default values for print options.

If the user input unit 110 outputs a display request signal to display a print-option-setting menu, the menu generation unit 240 generates the print-option-setting as shown in FIG. 3A based on the detailed information on the sent print information and the default or the predetermined options.

Referring to FIG. 3A, the print resolution is set to the default value of '600 dpi' that the printer 300 provides, the number of copies to 1, and the paper orientation to portrait. If a user adjusts the print resolution, the number of copies, and the paper orientation by manipulating the user input unit 110, the print-option-setting menu has changed values, such as, for example, those shown in FIG. 3B.

Figure 3B:
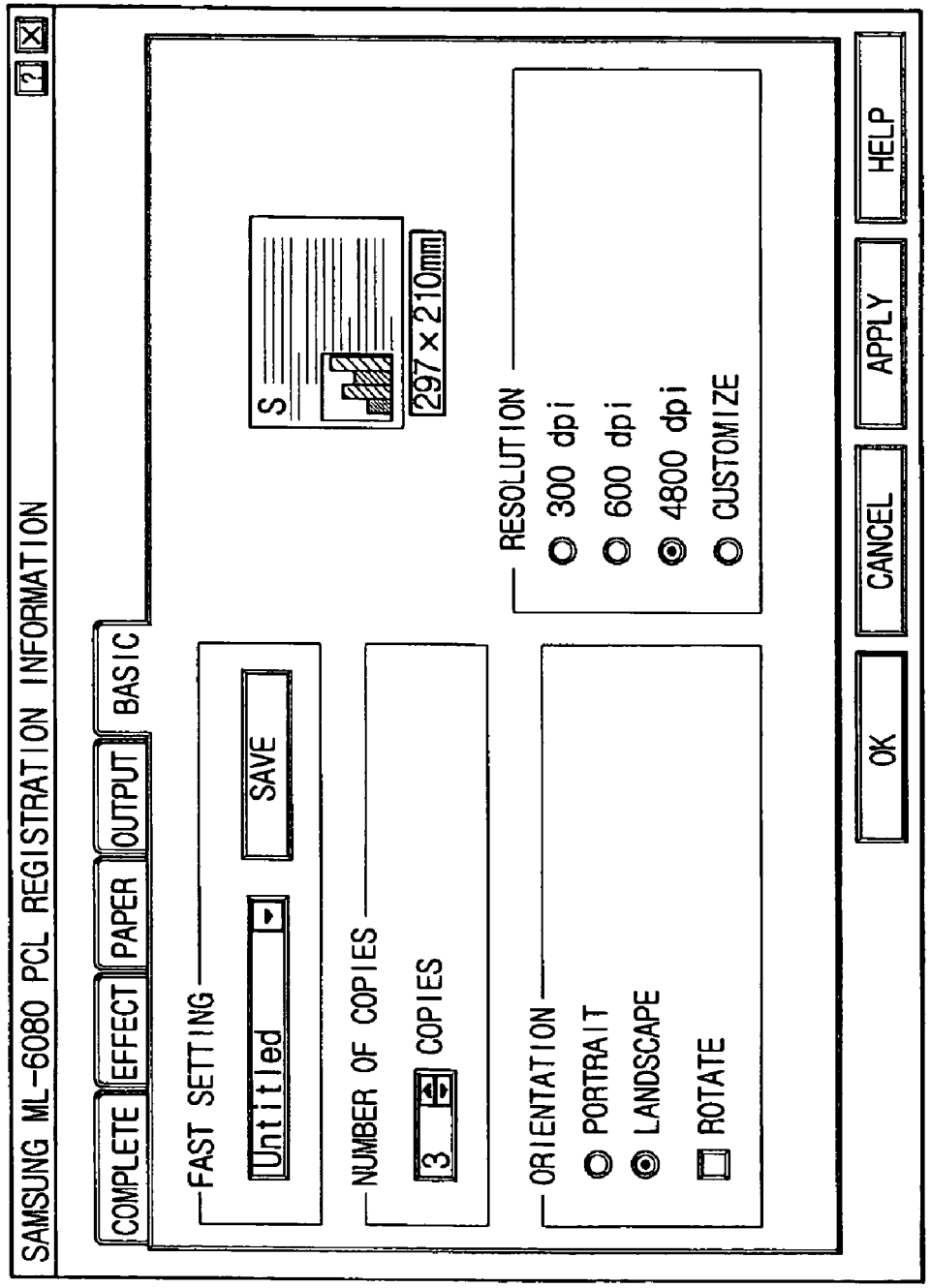
FIG. 3B is a view illustrating a print-option-setting menu having final print environment information adjusted according to manipulating the user input unit.

If a print job is performed by use of the print environment information, for example, the final print environment information adjusted as shown in FIG. 3B, the printer 300 prints data in the maximum resolution that the PCL emulation supports, resulting in three copies in landscape.

Different memory devices can be used for the first printer information storage 220 and the detailed information storage 230, or one memory device can be used for both storages 220 and 230.

Referring back to FIG. 1, the terminal interface unit 170 is a communication interface that connects to the printer 300, enabling the user terminal to communicate with the printer 300. The terminal interface unit 170 has a plurality of ports such a network port, a parallel port, a serial port, an infrared port, and a USB port, and one of the ports is connected to the printer 300.

If a print request signal is output from the user input unit 110, the terminal interface unit 170 sends to the printer 300 print data associated with the print documents prepared by the user terminal 100 and final print environment information set by manipulating the print-option-setting menu or set in the common printer driver unit 164. If the printer information is requested by the loading unit 210, the terminal interface unit 170 outputs the print information request signal to the printer 300, and receives the print information read out of the printer 300.

The printer 300 shown in FIG. 1 has an operation panel unit 310, a printer interface unit 320, a second printer information storage 330, a printer information readout unit 340, a main storage 350, a sub-storage 360, a printer engine unit 370, and a printer controller 380.

The operation panel unit 310 has a key operation unit (not shown) and a display unit (not shown). If a user manipulates the key operation unit (not shown) for a function that the printer 300 supports, the key operation unit outputs a signal associated with the function to the printer controller 380. The display unit (not shown) displays the operation status of the printer 300 according to the controls of the printer controller 380.

The printer interface unit 320 is a communication interface provided to enable communications with the user terminal 100. The printer interface unit 320 receives data for printing, final print environment information or a printer information request signal from the user terminal 100.

The second printer information storage 330 stores print information as shown in Table 1 that the printer 300 supports. The Table 1 is for exemplary print information that the printer 300 supports.

TABLE 1

Emulation type: PCL

| Print options | Default values |
|---|---|
| Paper size | A4 |
| Paper type | AUTO |
| Paper orientation | Portrait |
| Number of copies | 1 |
| Resolution | 600 dpi |
| . | . |
| . | . |
| . | . |

Referring to Table 1, the print information supported by the printer 300 includes default values for the print options and emulation type. Such print information is read out by the print information readout unit 340 and sent to the loading unit 210.

If the printer information readout unit 340 receives a printer information request signal from the loading unit 210, the printer information readout unit 340 reads out the print information stored in the second printer information storage 330, and provides the print information to the printer interface unit 320. Next, the printer interface unit 320 sends the read print information to the user terminal 100.

The main storage 350 contains various control programs necessary to implement the functions of the printer 300, and a firmware and an emulator 350a to print. The sub-storage 360 contains various data resulting from the operations of the printer 300.

If the print data and the final print environment information are received from the user terminal 100, the emulator 350a converts the print data into bitmap data. At this time, the emulator 350a applies an approach suitable to an emulation type for the conversion to the bitmap data. The printer engine unit 370 prints the bitmap data on recording sheets of paper based on the received final print environment information.

The printer controller 380 controls the overall operations of the printer 300 according to control programs. For example, the printer controller 380 controls the emulator 350a and the printer engine unit 370 to convert the print data sent from the user terminal 100 into the bitmap data and to print the converted data.

If the loading unit 210 requests print information, the printer controller 380 controls the printer information readout unit 340 and the printer interface unit 320, respectively, to read out the print information stored in the second printer information storage 330 and then send the read print information to the loading unit 210.

Figure 4:
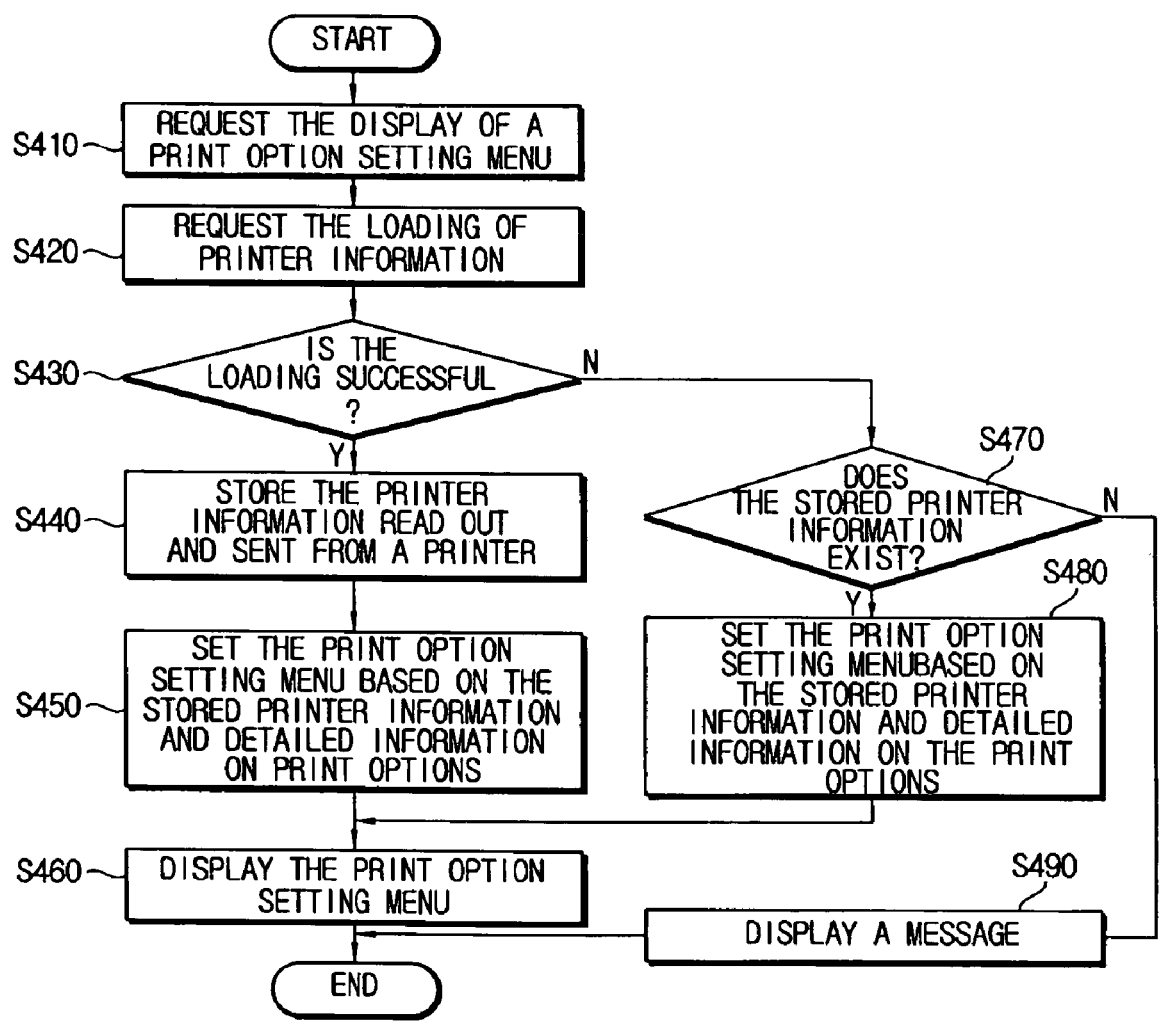
FIG. 4 is a flow chart illustrating exemplary operations to apply the common printer driver of FIG. 1.

FIG. 4 is a flow chart illustrating exemplary operations of the common printer driver unit applied in FIG. 1.

Referring to FIGS. 1 to 4, the user terminal 100 and the printer 300 are communicatively connected to each other through the communication network 10. If a display request signal for a print-option-setting menu is received from the user input unit 110 as operation S410, the loading unit 210 requests the print information stored in the printer 300 at operation S420.

If the print information is successfully sent in response to the request by the loading unit 210 at operation S430, the first printer information storage 220 stores the print information sent from the printer 300 at operation S440. The operations S430 and S440 will be described in more detail as follows. If a printer information request signal is received from the loading unit 210, the printer controller 380 controls the terminal interface unit 170 and the printer interface unit 320, respectively, to read out the printer information stored in the second printer information storage 330 and then send the read print information to the terminal interface unit 170.

The terminal interface unit 170 loads the print information to the loading unit 210, and the loading unit 210 provides the loaded print information to the first printer information storage 220. Thus, the loaded print information is stored in the first printer information storage 220 for the first time or updated. The print information is stored by printer serial number or the manufacturer identification (ID).

If the operation S440 is performed, the menu generation unit 240 generates the print-option-setting menu shown in FIG. 3A at operation S450. The menu generation unit 240 reads out the print information stored in the first printer information storage 220 and detailed information on options stored in the detailed information storage 230, and then generates the print-option-setting menu. The menu generation unit 240 checks the emulation type of the printer 300 that is stored in the operation S440, and then reads out the detailed information corresponding to the checked emulation. The print-option-setting menu generated in the operation S450 is a default window having default values as print information, wherein the default values can be adjusted to any value supported by the printer 300.

If the operation S450 is performed, the CPU 140 controls the VGA card 130 to display on the display unit 120 the print-option-setting menu generated from the menu generation unit 240 at operation S460.

However, if the terminal interface unit 170 fails to load the print information due to communication errors in the operation S430, the menu generation unit 240 checks the printer serial number or manufacturer identification and emulation type of the printer 300. If the printer serial number operation and emulation type of the printer 300 are checked, the menu generation unit 240 checks whether the print information corresponding to the checked printer serial number or manufacturer identification is stored in the first printer information storage 220 at operation S470.

If it is determined that the checked print information is stored, the menu generation unit 240 reads out the stored print information and the detailed option information of the default or predetermined options and generates the print-option-setting menu at operation S480.

However, if in operations S470 it is determined that the checked print information is not stored, the menu generation unit 240 generates a message such as "Failed to read information from the printer" and "Check if the printer is properly connected," or "Failed to load a proper printer driver information" and "Check if the printer is properly connected." The generated message is processed by the VGA card 130, and displayed on the display unit 120 at operation S490.

The printer system having the common printer driver unit 164 as described above, according to an embodiment of the present general inventive concept, loads the print information from the printer 300 for storage even though the print information, that is, printer driver to drive the printer 300 is already stored in the first printer information storage 220.

Furthermore, the printer system having the common printer driver unit 164 as described above, according to another embodiment of the present general inventive concept, can drive the printer 300 by use of the stored print information if the print information of the printer 300 is stored in the first printer information storage 220. That is, the common printer driver unit 164, according to another embodiment of the present general inventive concept, can be designed and configured to load the print information of the printer 300 to drive the printer 300 when the driver for the printer 300 is not installed in the user terminal 100.

Figure 5A:
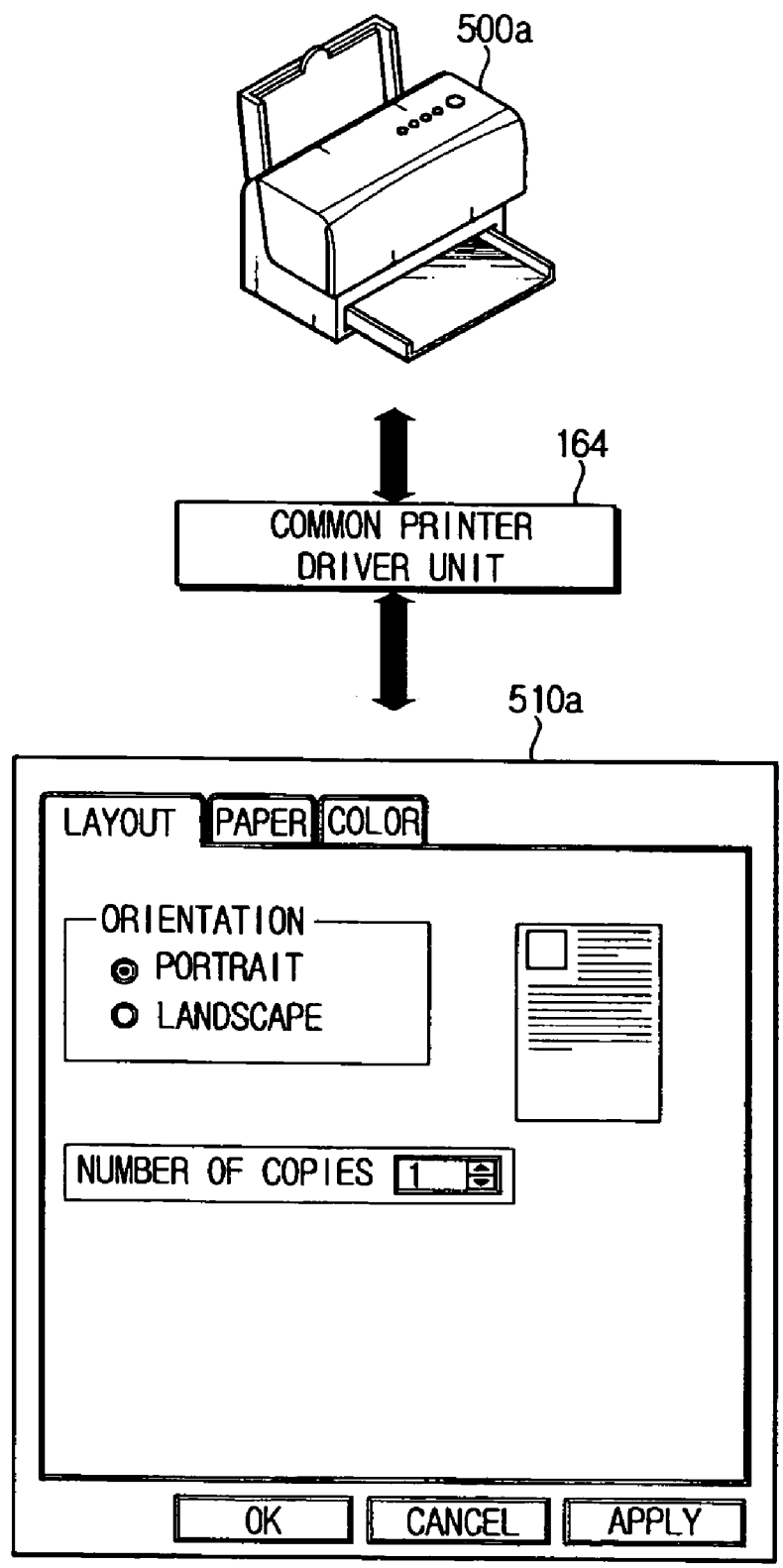
FIG. 5A to FIG. 5C are views illustrating exemplary print-option-setting menus implemented depending on printer models according to FIG. 1 to FIG. 4.
Figure 5B:
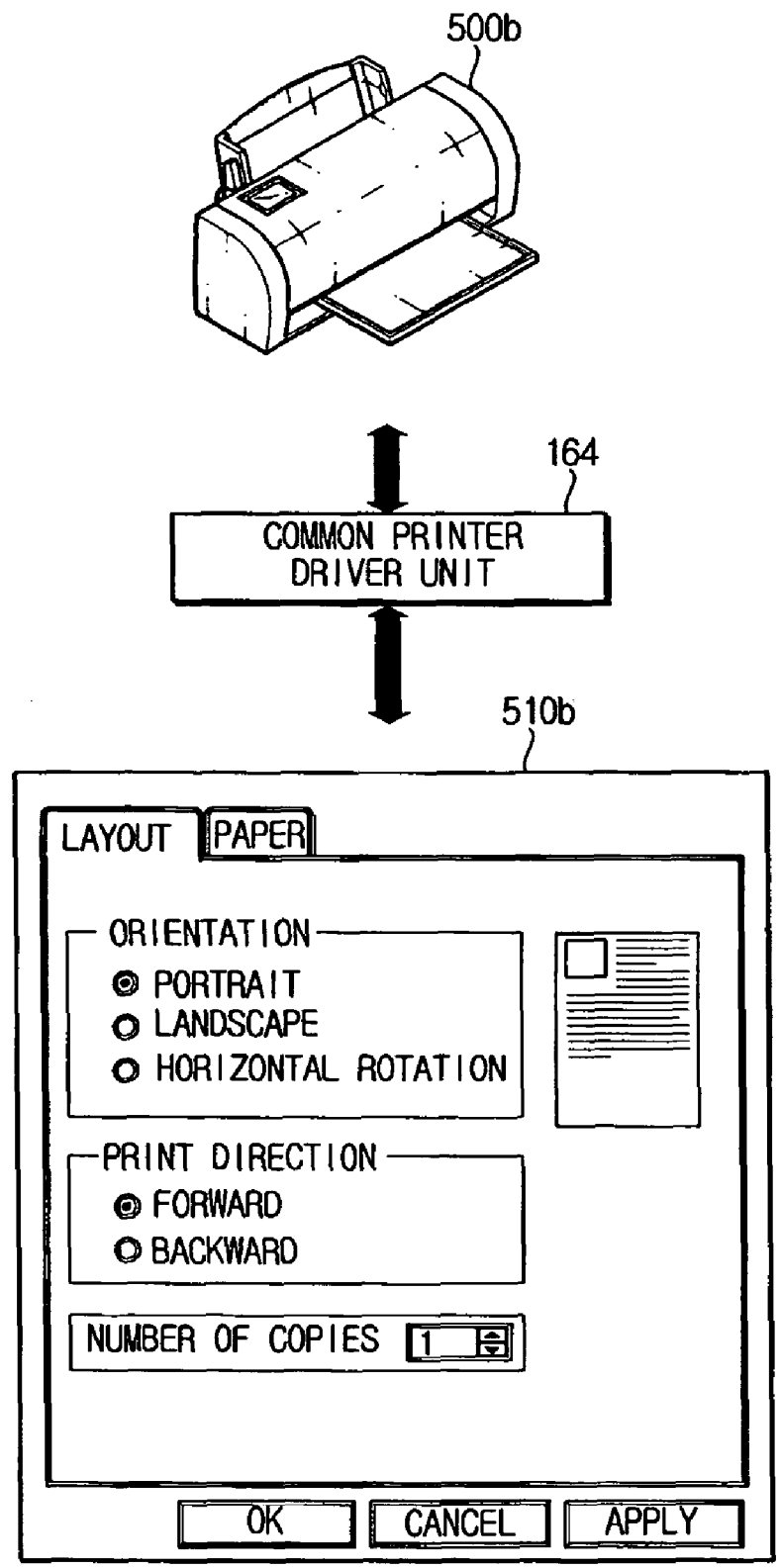
Figure 5C:
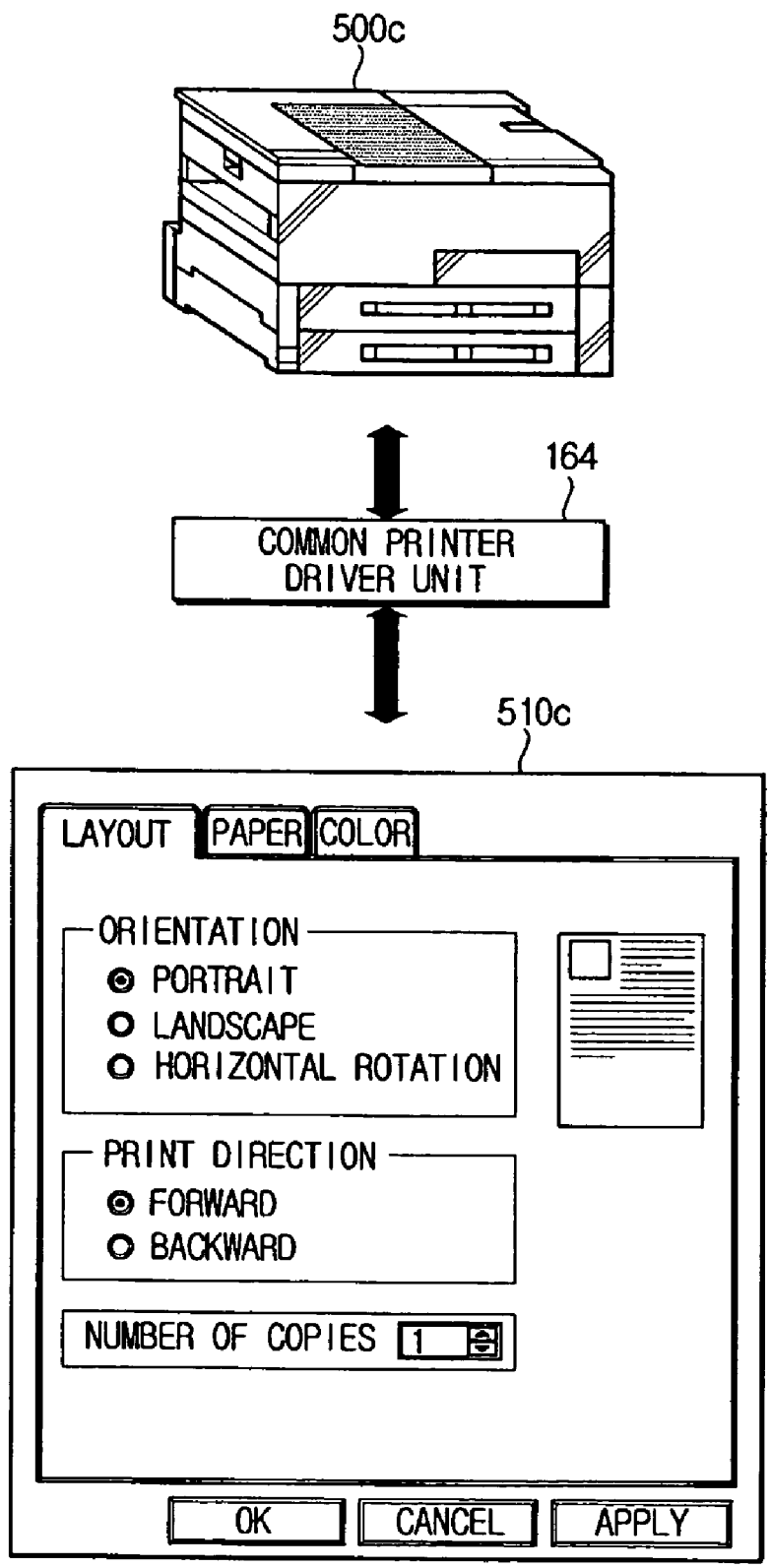

FIGS. 5A to 5C are views illustrating exemplary print-option-setting menus implemented depending upon printer models based on FIGS. 1 to 4.

The first to third printers 500a, 500b, and 500c are designed to be compatible with the common printer driver unit 164, and are connectable to the user terminal 100 to which the common printer driver unit 164 shown in FIG. 2 is applied.

Table 2 shows exemplary print information stored on the first to third printers 500a, 500b, and 500c shown in FIGS. 5A to 5C.

TABLE 2

| | | First printer | Second printer | Third printer |
|---|---|---|---|---|
| Device ID | | common | common | Common |
| Emulation type | | PCL6 | KS | KSSM |
| Data list | Paper size | A4 | A4 | A4 |
| | Paper type | AUTO | High quality | AUTO |
| | Paper orientation | Portrait | Portrait | Portrait |
| | Number of copies | 1 | 1 | 1 |
| | Resolution | 600 dpi | 100 dpi | 300 dpi |

Referring to FIG. 5A and Table 2, the first printer 500a has the manufacturer identification information of "common" and the emulation type of "PCL6." The first printer 500a also has a list of print options and default values for the options that are referred to as "data1."

If a print document prepared by the host computer is to be printed by use of the first printer 500a, the common printer driver unit 164 loads the print information of "PCL6" and "data1" from the first printer 500a, and reads out the detailed information, for example, specification data and the minimum and maximum values of print resolution, that is set to be suitable for the "PCL6." The common printer driver unit 164 generates a print-option-setting menu 510a based on the loaded print information and the detailed information related to the PCL6.

Referring to FIG. 5B and Table 2, the second printer 500b has the manufacturer ID of "common" and the emulation type of "KS." The second printer 500b also has a list of data for print options and default values of the options that are referred to as "data2."

If print document prepared by the host computer is to be printed by use of the second printer 500b, the common printer driver unit 164 loads the print information of "KS" and "data2" from the second printer 500b, and reads out the detailed information set to be suitable for the "KS." The common printer driver unit 164 generates a print-option-setting menu 510b by use of the detailed information related to the loaded print information and the detailed information related to the "KS."

Referring back to FIG. 5C and Table 2, the third printer 500c has the manufacturer ID of "common," the emulation type of "KSSM." The third printer 500c also has a list of data for print options and default values for the options that is referred to as "data3."

If a print document prepared by the host computer is to be printed by use of the third printer 500c, the common printer driver unit 164 loads the print information of "KSSM" and "data3" from the third printer 500c, and reads out the detailed information set to be suitable for the "KSSM." The common printer driver unit 164 generates a print print-option-menu 510c by use of the loaded print information and the detailed information related to the "KSSM".

Since the first to third printers 500a, 500b, and 500c have the same manufacturer ID, the common printer driver unit 164 can support the driving of the first to third printers 500a, 500b, and 500c. That is, even though the first printer 500a is replaced with the second printer 500b or the third printer 500c when the common printer driver unit 164 installed in the user terminal 100 serves as a driver for the first printer 500a, the common printer driver unit 164 still serves as a driver for the second printer 500b or the third printer 500c.

If the firmware of a printer is updated, the common printer driver device and method according to the various embodiments of the present general inventive concept can use options or functions that the updated firmware provides by use of the existing common printer driver. The update of the firmware refers to the case where options or functions that the printer supports are added or upgraded.

As described so far, if a plurality of printers is manufactured by the same manufcaturer with different product serial numbers, the common printer driver device and the method thereof according to the various embodiments of the present general inventive concept enables a single common printer driver to drive a plurality of printers. Therefore, the present general inventive concept can remove inconveniences caused by the installation of a new printer driver whenever printers connected to a computer are replaced.

In addition, if options or functions of a printer are added or upgraded, the present general inventive concept enables the added or upgraded options or functions to operate by using the existing common printer driver without having to install a new printer driver for the added or upgraded options or functions. The present general inventive concept can reduce the manufacturing cost since the printer manufacturers do not have to produce separate printer drivers suitable for each printer.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A common driver application device comprising:
a first communication unit to provide communication interface with a first printing apparatus;
a common printer driver unit to load print information from the first printing apparatus that is stored in the first printing apparatus including default values for print options and emulation type that are supported by the first printing apparatus, and to provide a print-option-setting menu enabling a user to adjust the default values for the print options, if the first communication unit is communicatively connected to the first printing apparatus, the common printer driver unit including:

a loading unit to request and load the print information to and from the first printing apparatus; and a first print information storage to store the loaded print information; and a central processing unit to execute the common printer driver unit to load the print information from the first printing apparatus, if the first communication unit is connected to the first printing apparatus, the central processing unit to control the common printer driver unit to request the loading of the print information and display a message when the requested load cannot be completed, wherein the emulation type is information regarding emulation to convert print data into bitmap data and includes minimum and maximum values of print resolution for the emulation type, wherein, when the first printing apparatus connected to the first communication unit is replaced with a second printing apparatus, the common printer driver unit only loads second print information that includes default values for print options and emulation type of the second printing apparatus from the second printing apparatus that are different from the print information of the first printing apparatus when the first printing apparatus and second printing apparatus have the same manufacturer identifications (IDs) but different serial numbers.

2. The common driver application device as claimed in claim 1, further comprising a user input unit to request the print-option-setting menu to be displayed, and to enable a user to adjust the default values of the print options if the print option setting menu is displayed.

3. The common driver application device as claimed in claim 2, wherein the common printer driver unit comprises:

a detained information storage to store detailed information on predetermined options of the print options that are provided differently depending on the emulation type; and a menu generation unit to generate the print-option-setting menu based on the stored print information and the detailed information on the predetermined options, wherein the central processing unit controls the common printer driver unit to generate the print-option-setting menu, if the display request is received from the user input unit.

4. The common driver application device as claimed in claim 3, wherein the detailed information on the predetermined options includes minimum and maximum values of print resolution that are provided differently depending on the emulation type.

5. The common driver application device as claimed in claim 1, wherein the print options are functions differently provided depending on a type of the first printing apparatus, and include at least one of options setting the type of paper on which data is printed, paper orientation, the number of copies, and print resolution.

6. The common driver application device as claimed in claim 1, wherein the emulation type that the first print apparatus supports is at least one of Printer Control Language (PCL), KSSM, KS, Epson, and PostScript.

7. The common driver application device as claimed in claim 3, wherein the first print apparatus comprises:

a second print information storage to store the print information to be loaded according to the loading unit;

a print information readout unit to out the print information from the second print information storage;

a second communication unit to send the read print information to the first communication unit; and a control unit to control the print information readout unit and the second communication unit to read out and send the print information to the first communication unit, if the loading is requested from the loading unit.

8. The common driver application device as claimed in claim 1, wherein the print-option-setting menu displays default values for the displayed print options.

9. The common driver application device as claimed in claim 3, wherein the first print information storage and the detailed information storage are updated by print information stored on the printing apparatus when the user input unit issues subsequent display requests.

10. The common driver application device as claimed in claim 1, further comprising an application program unit to store applications in which various documents can be prepared.

11. A common driver application method, comprising:

communicatively connecting to a first printing apparatus;

requesting to the first printing apparatus by a common printer driver to load print information from the first printing apparatus, including default values for print options and emulation type that are supported by the first printing apparatus and information for a print-option-setting menu;

storing the print information loaded from the first printing apparatus;

reading out the stored print information by the first printing apparatus when the common printer driver requests the loading of the print information and displaying a message when the reading out of the stored print information cannot by completed;

sending the read print information to the common printer driver; and providing the print-option-setting menu enabling a user to adjust the default values for the print options, wherein the emulation type is information regarding emulation to convert print data into bitmap data and includes minimum and maximum values of print resolution for the emulation type, wherein, when the first printing apparatus is replaced with a second printing apparatus, the common printer driver only loads second print information that includes values for print options and emulation type of the second printing apparatus from the second print apparatus that are different from the printing information of the first printing apparatus when the first and second printing apparatuses have the same manufacturer identifications (IDs) but different serial numbers.

12. The common driver application method as claimed in claim 11, further comprising requesting display of the print-option-setting menu enabling a user to adjust the default values for the print options prior to the connection operation, wherein the operation of providing the print-option-setting menu generates and displays the print-option-setting menu based on the stored print information and detailed information on predetermined options of the print options provided differently depending on the emulation type.

13. The common driver application method as claimed in claim 12, wherein the detailed information on the predetermined options includes minimum and maximum values of print resolution provided differently depending on the emulation type.

14. The common driver application method as claimed in claim 11, wherein the print options are functions provided differently depending on a type of the first printing apparatus, and include at least one of options setting the type of paper on which data is printed, paper orientation, the number of copies, and print resolution.

15. The common driver application method as claimed in claim 11, wherein the emulation type that the first print apparatus supports is at least one of Printer Control Language (PCL), KSSM, KS, Epson, and PostScript.

16. A non-transitory computer-readable medium providing commands for computers to execute a process including:
communicatively connecting to a first printing apparatus;
requesting the first printing apparatus by a common printer driver to load print information from the printing apparatus, including default values for print options and emulation type that the first printing apparatus supports and information for a print-option-setting menu;
storing the loaded print information that the first printing apparatus provides;
reading out the stored print information by the first printing apparatus when the common printer driver requests the loading of the print information and displaying a message when the reading out of the stored print information cannot be completed;
sending the read print information to the common printer driver; and
providing the print-option-setting menu enabling a user to adjust the default values for the print options,
wherein the emulation type is information regarding emulation to convert print data into bitmap data and includes minimum and maximum values of print resolution for the emulation type,
wherein when the first printing apparatus is replaced with a second printing apparatus, the common printer driver only loads second print information that includes values for print options and emulation type of the second printing apparatus from the second print apparatus that are different from the printing information of the first print apparatus when the first and second printing apparatuses have the same manufacturer identifications (IDs) but different serial numbers.

17. The non-transitory computer-readable medium as claimed in claim 16, wherein a manufacturer identification or serial number is associated with the emulation type.

18. The non-transitory computer-readable medium as claimed in claim 16, wherein a print request is generated via the print-option-setting menu.

19. The non-transitory computer-readable medium as claimed in claim 18 wherein the print request transmits print data and print option values to the first printing apparatus via a common print driver unit.

20. The non-transitory computer-readable medium as claimed in claim 18, wherein the print request is converted to printer language commands associated with the emulation type.

21. The non-transitory computer-readable medium as claimed in claim 19, further comprising:
upon a communication failure, determining whether the print request can be completed using print information stored on the medium.

22. The non-transitory computer-readable medium as claimed in claim 19, wherein the common print driver unit is compatible with a plurality of different printers.

23. A print system to allow one common print driver to drive a plurality of different printers comprising:
a user terminal comprising a terminal interface to enable communication printers and a common print driver unit to be executed by the user terminal to load first printer information and a detailed information storage to store other print information, and a menu generation unit associated with the printers, including default values for print options and emulation type that are supported by the printers and information for the menu generation unit, the common printer driver unit including:
a loading unit to request and load the print information to and from the first printer and display a message when the requested load cannot be completed; and
a first print information storage to store the loaded print information; and each of the plurality printers having a printer interface communicatively connected to the common print driver unit and an emulator, wherein replacing the connected printer with a new printer generates a printer information request,
wherein the emulation type is information regarding emulation to convert print data into bitmap data and includes minimum and maximum values of print resolution for the emulation type,
wherein, when the first printer connected to the terminal interface is replaced with the second printer, the common printer driver unit only loads second print information including default values for print options and emulation type of the second printer from the second printer that are different from the first printer information when the first printer and second printer have the same manufacturer identifications (IDs) but different serial numbers.

24. A printer system as claimed in claim 23, wherein the menu generation unit checks the print information, corresponding to a serial number or manufacturer identification, stored in the first printer information storage, if the printer information request fails.

25. A printer system as claimed in claim 24, wherein if the menu generation unit determines that the print information is not stored in the first printer information storage the menu generation unit generates a message.

26. A printer system as claimed in claim 24, wherein if the menu generation unit determines that the print information is stored in the first printer information storage the menu generation unit generates a print-option-setting menu based on print information stored in the first printer information storage and the detailed information storage.

27. A common driver application device comprising:
a means for communicatively connecting to a first printer;
a means for executing the common driver application to request the first printer to load print information from the first printer to the common driver application device, the print information including default values for print options and emulation type that are supported by the first printer;
a means for storing the requested print information display a message when the requested load cannot be completed; and
a means for providing a print-option-setting menu corresponding to the connected first printer and enabling a user to adjust the default values for the print options,
wherein the emulation type is information regarding emulation to convert print data into bitmap data and includes minimum and maximum values of print resolution for the emulation type,
wherein, when the first printer connected to the means for communicatively connecting is replaced with a second printer, the common driver application only loads second print information that includes default values for print options and emulation type of the second printer from the second printer that are different from the print information of the first printer when the first printer and second printer have the same manufacturer identifications (IDs) but different serial numbers.

28. A print driver device to drive a plurality of different printers, comprising:
a terminal interface unit to interface with at least one of the plurality of printers;
a user terminal having a common printer driver unit to load print information from a first printer and a menu generation unit associated with the first printer, where the print information includes information for the menu generation unit, the user terminal to display a message when the print information cannot be loaded; and
a central processing unit to drive the common printer driver to load the print information from the interfaced first printer,
wherein the print information includes default values for print options and emulation type that are supported by the first printer, and the emulation type is information regarding emulation to convert print data into bitmap data and includes minimum and maximum values of print resolution for the emulation type,
wherein, when the first printer connected to the terminal interface unit is replaced with a second printer, the common printer driver unit only loads second print information that includes default values for print options and emulation type of the second printer from the second printer that are different from the print information of the printer when the first printer and second printer have the same manufacturer identifications (IDs) but different serial numbers.

29. A method of driving a plurality of different printers, the method comprising:
interfacing a user terminal with a first printer of the plurality of printers;
driving a common printer driver on the user terminal and loading the print information including values for print options and emulation type for a print option setting menu from the interfaced first printer; and
displaying the print option setting menu including the values for the print options, and displaying a message when the print information cannot be loaded,
wherein the emulation type is information regarding emulation to convert print data into bitmap data and includes minimum and maximum values of print resolution for the emulation type,
wherein, when the first printer connected to the user terminal is replaced with a second printer, the common printer driver only loads second print information of the second printer from the second printer that is different from the print information of the first printer when the first printer and second printer have the same manufacturer identifications (IDs) but different serial numbers.

* * * * *